United States Patent [19]
Bettin

[11] 3,732,408
[45] May 8, 1973

[54] OUTPUT DEVICE FOR ELECTRONIC DATA PROCESSING SYSTEMS

[75] Inventor: Hubertus Bettin, Braunschweig, Germany

[73] Assignee: Olympia Werke AG, Wilhelmshaven, Germany

[22] Filed: Mar. 16, 1971

[21] Appl. No.: 124,768

[30] Foreign Application Priority Data

Mar. 16, 1970 Germany....................P 20 12 305.1

[52] U.S. Cl...................235/155, 101/93 C, 235/156
[51] Int. Cl. ...........B41j 5/00, B41j 5/04, G06f 5/02
[58] Field of Search............................235/156, 155; 101/93 C; 340/172.5

[56] References Cited

UNITED STATES PATENTS 3,384,009 5/1968 Hilgendorf et al.................101/93 C

*Primary Examiner*—Maynard R. Wilbur
*Assistant Examiner*—Thomas J. Sloyan
*Attorney*—Spencer & Kaye

[57] ABSTRACT

In a system for converting binary data into a decimal readout and in which the bits of a succession of binary words are fed in series into a shift register and fed out therefrom in parallel to control the selection of each decimal digit of the readout, a circuit for controlling the insertion of a decimal point at a selected location of the decimal readout by the application of a signal to a selected one of a plurality of selection inputs each corresponding to a respective location of the decimal readout, the circuit applying an additional shift pulse to the shift register for preventing the storage of a data bit in the shift register location corresponding to the selected decimal readout location and triggering the insertion of a decimal point at the selected readout location.

5 Claims, 1 Drawing Figure

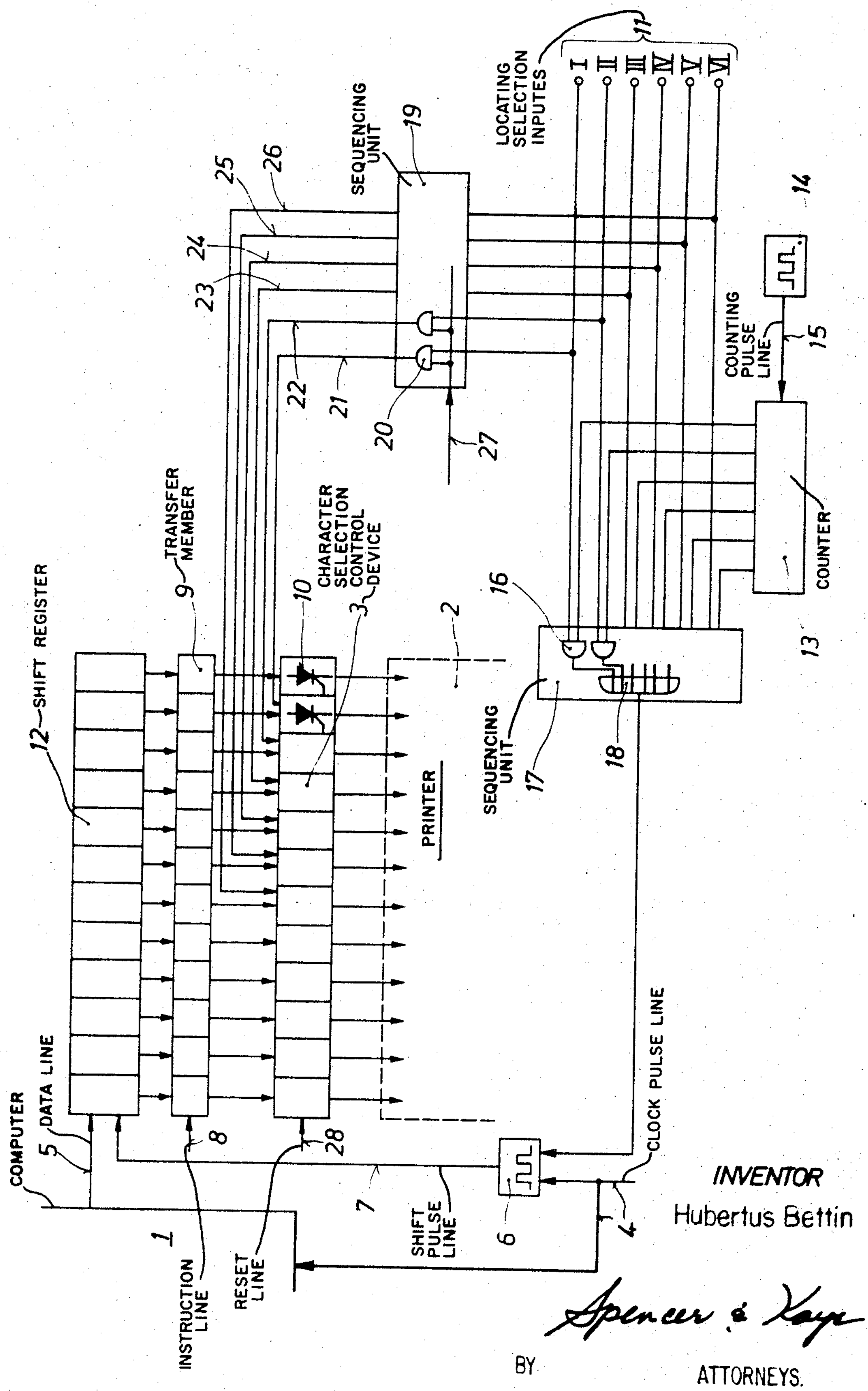
INVENTOR
Hubertus Bettin
BY Spencer & Kaye
ATTORNEYS.

OUTPUT DEVICE FOR ELECTRONIC DATA PROCESSING SYSTEMS

BACKGROUND OF THE INVENTION

The present invention relates to a circuit arrangement for inserting a symbol, for example a decimal point, at a predetermined point in a readout of an electronic data processing system, particularly electronic table-model calculators in which the data to be read out is shifted into a shift register in the correct digital positions and is transferred in parallel into the readout device.

Readout devices for electronic data processing systems are known in which, for example, the data which is contained in a memory of the calculator and which is to be read out is fed into a comparison device. At the same time a counter feeds to the comparison device a symbol which corresponds to the decimal character then available for reproduction in the output device. In the comparison device, all the characters of the data are compared with the available character from the counter and the results are entered into a shift register. After this passage of the data, a character is represented in the shift register by each location containing either a signal or no signal. Upon a common instruction, a transferring member is now caused to emit all of the signals in parallel, i.e., all those locations for which the comparison result was positive, and the appropriate print-out type wheels are arrested at a corresponding position. There then occur comparisons with the subsequent characters until all of the locations of the printing mechanism are set.

In such output devices there often exists the necessity to be able to insert into the data print-out a symbol such as a decimal point, which is not contained in the memory. Details of a prior art output device are shown and described for example in the U.S. Pat. 3,384,009.

SUMMARY OF THE INVENTION

It is an object of the present invention to provide an inexpensive circuit arrangement for permitting insertion of such a character at a predeterminable point in the data print-out.

This is accomplished, according to the present invention, in that inputs for the location selection for the symbol are connected, together with the outputs of the stages of a clock pulse controlled counter, to a first sequencing unit, or comparator and, together with one input for the availability indication of the readout device, to a second sequencing unit, or comparator, and in that an output signal from the first sequencing unit effects the emission of a shift pulse to the shift register and an output signal from the second sequencing unit effects the emission of a signal to an electronic switch associated with one of the preselected columns in the readout device.

The electronic switches for the readout device are constituted by thyristors in one advantageous embodiment, which thyristors can be actuated by the output signals of the second sequencing unit.

The advantages of the present invention consist particularly in that independently of the data contained in the data processing system, a symbol can be inserted at any desired location in the readout device without thus requiring a modification of the entire structure for the read-out of the data from the data processing system and for the indication or print-out.

BRIEF DESCRIPTION OF THE DRAWING

The single FIGURE is a block circuit diagram of one embodiment of a circuit arrangement according to the present invention.

DESCRIPTION OF THE PREFERRED EMBODIMENTS

In the illustrated circuit, data to be printed, for example by a printing mechanism 2, is shifted, in a known manner which will not be described in detail, from the computing mechanism of an electronic computer 1 into a shift register 12. This transfer is effected over a line 5 and with the aid of a shift pulse coming from a pulse generator 6 via line 7. The production of pulses in generator 6, and the corresponding shift pulses in computer 1, is controlled by clock pulses applied via line 4.

After being stored in register 12, the signals contained in the individual locations of the shift register are to be transferred in parallel, upon receipt of an instruction via line 8, by transfer members 9 and utilized to actuate associated electronic switches of the character selection control device 3, e.g., to fire thyristors 10. For example, each thyristor which receives a signal corresponding to a binary "1" is rendered conductive and those thyristors 10 which are thus rendered conductive and those thyristors 10 which are thus rendered conductive actuate corresponding printing elements, for example by means of electromagnets.

Thus, the first binary word determines the location of all decimal ones to be printed out, the second word locates all twos, etc., until a number has been selected for eleven locations of the twelve-location printing mechanism 2. The twelfth location is to be occupied by a decimal point, for example between the third and fourth decimal digits from the right. This decimal point location has been predetermined for this purpose by the application of a signal to one of the location selection inputs of group 11, in this case the input III.

After each shift pulse which is fed to the shift register 12 via line 7, a six-stage counter 13 receives a counting pulse from a second pulse generator 14 via line 15 also in dependence on the shift pulse. The counting pulses are fed from the stages of counter 13 to respective AND circuits 16 in a sequencing unit or first comparator, 17, only two of the six AND circuits being shown. The second input of each AND circuit is formed by one of the location selection inputs 11 so that in this example the AND circuit 16 associated with input III produces an output when the third data item is fed into shift register 12 and when the counter 13 has a pulse shifted into its third stage. This has the result of causing OR circuit 18 of sequencing unit 17 to produce, in generator 6, an additional shift pulse for the shift register 12 and consequently the next data item from computer 1 ultimately reaches not the fourth location but rather the fifth location from the right in register 12. The additional shift pulse is timed to be interposed between successive shift pulses generated by the signals on line 4. This can be accomplished by a suitable timing of the pulses from generator 14, the delays in units 13 and 17, and/or a delay line in the conductor between units 17 and 6.

After the information from the computer 1 has been placed into the shift register 12 and all of the associated thyristors 10 have fired at the correct instants and consequently all of the printing elements in printing mechanism 2 have been selected and are being held in readiness, the fourth location from the right of register 12 has remained unoccupied. Now a second sequencing unit 19 receives a signal via line 27 which indicates the readiness of the printing mechanism for selecting and making available the printing element for the decimal point. This signal is fed in common to all AND circuits 20 in the second sequencing unit 19, there being six AND circuits only two of which are shown, whereas the second input of each AND circuit 20 is again constituted by one of the position location selection inputs 11.

Each of the outputs 21 to 26 of AND circuit 20 in the second sequencing unit 19 is associated with a respective location in the printing mechanism 2 and a signal on each output will effect the closing of the respective electronic switch of the character selection control device 3, i.e. the firing of a thyristor 10.

To display a decimal point in the fourth location in the selected example, the AND condition will thus be met for the third AND circuit, having output 23, and the thyristor 10 for the fourth location will become conductive. The printing element for printing a decimal point will thus be selected in the fourth character location.

After all 12 characters are in readiness, the print-out occurs in a known manner and the thyristors 10 are returned to their blocked state by a reset pulse applied via reset line 28, also in a known manner.

In one exemplary arrangement in which the present invention may be provided, numbers having 11 digits are printed by means of 12 type wheels each having 11 character positions. Each wheel has the 10 characters 1, 2 . . . 9, 0 distributed around its circumference and the second to the seventh wheel from the right each additionally has a decimal point in its eleventh character position.

The wheels normally rotate in a continuous or stepwise manner in synchronism until each is stopped by the firing of its respective thyristor 10. The information delivered to register 12 determines the time when each wheel is stopped. Thus, the first word fed into register 12 determines which wheels will print 1' s in that this word contains a binary 1 in each of the locations which coincide with those wheels. The second word contains binary 1's in locations corresponding to the wheels to print 2's, etc.

To enable the words fed into register 12 to effect the desired selection, it is only necessary that each word be delivered to the switches of the character selection control device 3 when the corresponding character of the type wheels is in the operative position. This is assured by causing the wheels to undergo one cycle of rotation during the period for feeding eleven words into register 12, the period for feeding each word into register 12 corresponding to the period between pulses on line 8 and thus to eleven periods of the pulses on line 4 for controlling the input of each bit from computer 1 and each shift in register 12.

When the type wheels are in position to print the character "1," the first word fed into register 12 reaches the character selection control device, activating the thyristors at the locations where a "1" is to be printed and stopping the associated print wheels. The same then occurs for digits 2 through 0.

Then, when the remaining wheel, which has not yet been halted, reaches the point where its 11th character position is in the operative position, the pulse on line 27 produces a pulse on one of lines 21–26 to fire the corresponding thyristor to stop the remaining wheel.

It will be understood that the above description of the present invention is susceptible to various modifications changes and adaptations, and the same are intended to be comprehended within the meaning and range of equivalents of the appended claims.

Therefore, what I claim is:

1. For use in an electronic data processing system each readout of which is displayed in the form of a sequence of characters and a given symbol at a series of readout locations, the system providing, for each such readout, a series of data words representative of such readout and each composed of a plurality of bits, and a selection signal identifying the readout location at which the given symbol is to be inserted, the system including a shift register having a plurality of stages and connected to receive each data word in sequence, the bits of each data word being fed in series into the register, a readout character selection control device connected to the shift register to permit the bits of each data word in the register to be transferred in parallel into the control device, a readout device connected to the control device and presenting the readout locations, and a source of clock pulses having a given repetition rate, the source being connected to the shift register to cause the bits of each successive data word to be shifted from one register stage to the next at such given rate, the improvement composed of a symbol insertion control circuit, comprising in combination:

a plurality of location selection inputs each corresponding to a respective one of the readout locations at which the given symbol may be inserted, said inputs being connected to the system for causing the selection signal for each readout to be applied only to that one input which corresponds to the readout location at which the given symbol is to be inserted;

a pulse controlled counter having a plurality of stages equal in number to said plurality of inputs and connected to receive a series of pulses occurring at the given rate and to shift such pulses from one stage thereof to the next at such rate, said pulses received by said counter bearing a phase relation to the clock pulses such as to cause the extra shift pulse to be produced between two successive clock pulses, thereby reserving a readout location in storage for the given symbol, which location is the same for each data word associated with a single readout;

a sequencing unit having a plurality of pairs of inputs, one input of each pair being connected to a respective location selection input and the other input of each pair being connected to a respective counter stage, said sequencing unit including logic means connected to each pair of inputs for producing an output signal when a pulse appears at that counter stage which is connected to same pair of inputs as that selection input to which the selection signal is applied;

means connecting said logic means to the shift register for causing the output signal from said logic means to apply an extra shift pulse to the register during the feed in of each data word thereto; and means effectively connecting each said selection input to that portion of the character selection control device associated with its corresponding readout location for causing the selection signal to effect the insertion of the given symbol at the selected readout location.

2. An arrangement as defined in claim 1, further comprising a plurality of electronic switches in the form of thyristors forming part of the character selection control device, each thyristor being connected to the readout device to control the output at a selected location in the readout and to be actuated by a signal on the selection input associated with its respective location.

3. An arrangement as defined in claim 2, further comprising a pulse generator connected to said counter for producing the pulses which control said counter, said generator producing pulses at a rate equal to the rate at which signals are shifted through the stages of the shift register.

4. An arrangement as defined in claim 3, wherein said sequencing unit comprises a group of AND circuits each having two inputs constituting a respective pair of inputs, and an OR circuit having a plurality of inputs each connected to the output of a respective AND circuit.

5. An arrangement as defined in claim 4, wherein said means connecting each selection input to the character selection control device comprise: a second group of AND circuits each having one input connected to a respective selection input and a second input connected to a common signal line which provides a gating signal indicating the readiness of the readout device to insert the given symbol, each AND circuit having an output connected to actuate a respective electronic switch.

* * * * *